(12) United States Patent
Yamakawa et al.

(10) Patent No.: US 8,417,389 B2
(45) Date of Patent: Apr. 9, 2013

(54) CONTROL SYSTEM, OSCILLATION CONTROL DEVICE, AND CONTROL SIGNAL GENERATION METHOD

(75) Inventors: Takeshi Yamakawa, Fukuoka (JP); Tatsuji Tokiwa, Fukuoka (JP)

(73) Assignee: National University Corporation Kyushu Institute of Technology, Kitakyushu-shi (JP)

( * ) Notice: Subject to any disclaimer, the term of this patent is extended or adjusted under 35 U.S.C. 154(b) by 0 days.

(21) Appl. No.: 12/920,986

(22) PCT Filed: Feb. 20, 2009

(86) PCT No.: PCT/JP2009/053040
§ 371 (c)(1), (2), (4) Date: Sep. 3, 2010

(87) PCT Pub. No.: WO2009/110331
PCT Pub. Date: Sep. 11, 2009

(65) Prior Publication Data
US 2011/0015790 A1 Jan. 20, 2011

(30) Foreign Application Priority Data
Mar. 4, 2008 (JP) ................... 2008-52752

(51) Int. Cl.
*G01M 1/38* (2006.01)
(52) U.S. Cl.
USPC ....................................... 700/280
(58) Field of Classification Search .............. None
See application file for complete search history.

(56) References Cited

U.S. PATENT DOCUMENTS 6,581,046 B1 * 6/2003 Ahissar ...................... 706/15
2005/0177080 A1 * 8/2005 Yasuhara et al. ............ 602/16

FOREIGN PATENT DOCUMENTS

| JP | 6028006 | 2/1994 |
| JP | 2006289602 | 10/2006 |

OTHER PUBLICATIONS

Hirano and Rybicki, "Existence of Limit Cycles for Coupled Van Der Pol Equations", Journal of Differential Equations, vol. 195, issue 1, Nov. 20, 2003, pp. 194-209.*
Kimura, Fukuoka and Cohen, "Adaptive Dynamic Walking of a Quadruped Robot on Natural Ground Based on Biological Concepts", International Journal of Robotics Research, vol. 26, Issue 5, May 2007, pp. 475-490.*
Watanabe, Tajima, and Izumi, "Locomotion Pattern Generation of Semi-Looper Type Robots Using Central Pattern Generators Based on Van der Pol Oscillators", IEEE International Conference on Industrial Informatics 2008, Jul. 2008, pp. 377-382.*

(Continued)

*Primary Examiner* — Kakali Chaki
*Assistant Examiner* — Walter Hanchak
(74) *Attorney, Agent, or Firm* — Rankin, Hill & Clark LLP

(57) ABSTRACT

There is proposed a control system and the like that can realize a CPG (Central Pattern Generator) network having high controllability. A control system (CPG network) includes a plurality of oscillation control devices (CPG) and one target signal generating device (rhythm generator (RG)). Each CPG and the RG are described by the Van der Pol equation, and an amplitude and a period of an output waveform are substantially independently controlled by an external signal. In order to control a phase difference between the CPGs, the period of each CPG is temporarily controlled through connections that are only conjunctions between the each CPG and the RG.

4 Claims, 15 Drawing Sheets
(6 of 15 Drawing Sheet(s) Filed in Color)

OTHER PUBLICATIONS

Collins and Stewart, "Coupled Nonlinear Oscillators and the Symmetries of Animal Gaits", Journal of Nonlinear Science, vol. 3, 1993, pp. 349-392.*

Bay and Hemami, "Modeling of a Neural Pattern Generator with Coupled Nonlinear Oscillators", IEEE Transactions on BioMedical Engineering, vol. BME-34, No. 4, Apr. 1987, pp. 297-306.*

Kiyotaka Izumi, Akihito Tajima, Keigo Watanabe, and Guang Lei Liu, "A Construction Method for CPG Networks Using Van Der Pol Oscillators," Proc 16th Inteligent System Symposium, The Japan Society of Mechanical Engineers, Sep. 25, 2006, pp. 365-368.*

Tatsuji Tokiwa and Takeshi Yamakawa, "A Central Pattern Generator Network Model with INdependent Controllability", Proc 8th POSTECH-KYUTECH Joint Workshop on Neuroinformatics, 2008, pp. 75-76.*

Veskos and Demiris, "Developmental acquisition of entrainment skills in robot swinging using van der Pol oscillators", Proceedings of the EPIROB-2005, 2005, pp. 87-93.*

Kiyotaka Izumi, Akihito Tajima, Keigo Watanabe and Guang Lei Liu, A Construction Method for CPG Networks Using Van der Pol Oscillators, Proc. 16th Intelligent System Symposium, The Japan Society of Mechanical Engineers, Sep. 25, 2006, p. 365-368.

* cited by examiner

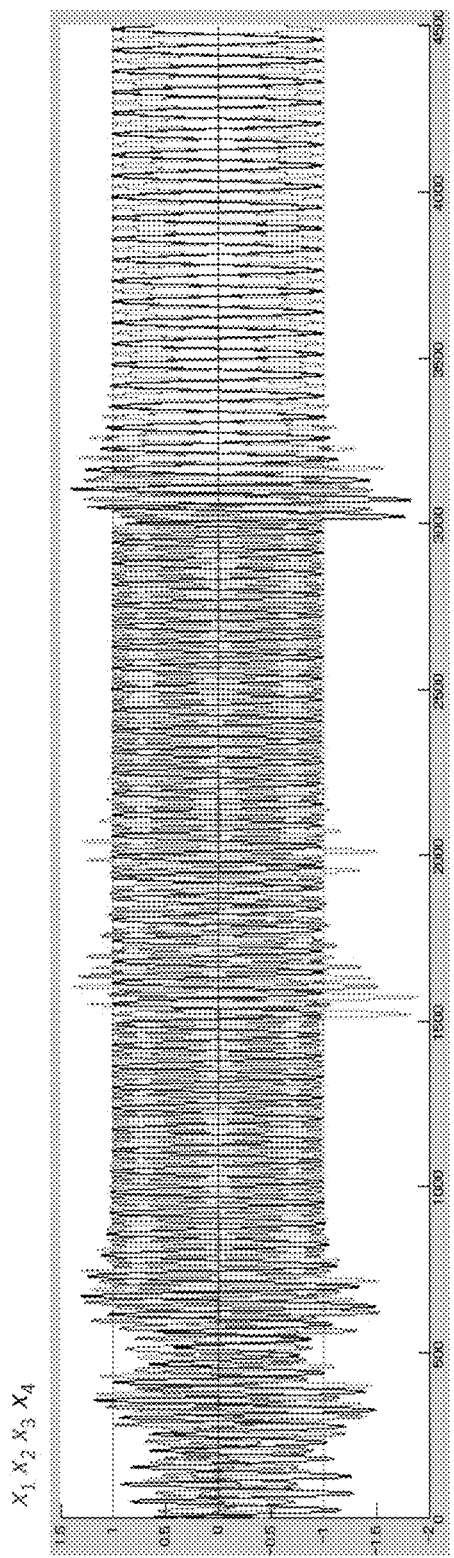
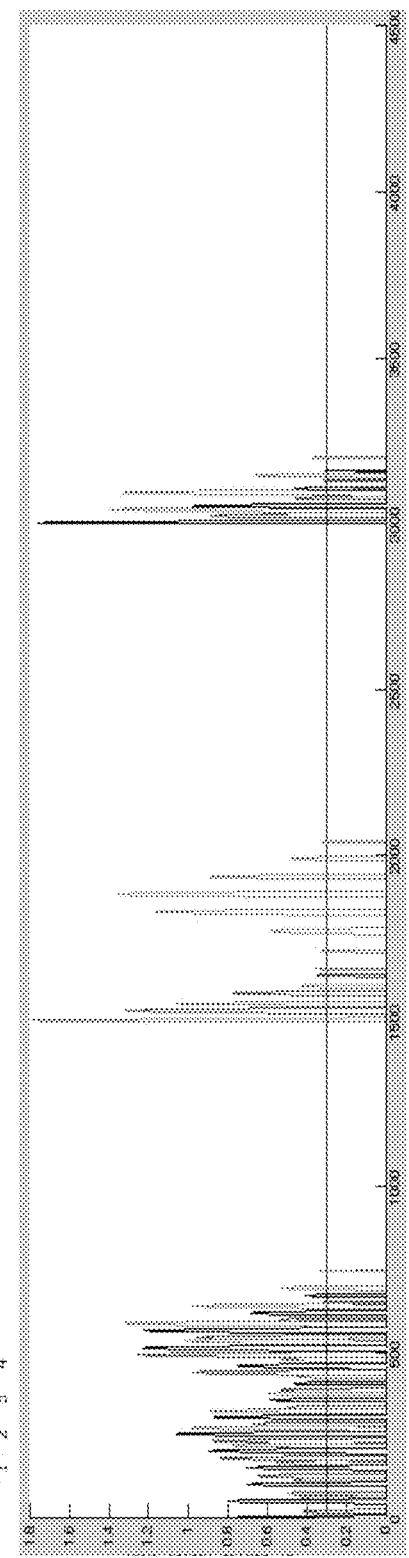
Fig. 12(a)
Fig. 12(b)

CONTROL SYSTEM, OSCILLATION CONTROL DEVICE, AND CONTROL SIGNAL GENERATION METHOD

TECHNICAL FIELD

The present invention relates to a control system, an oscillation control device, and a control signal generation method, and particularly to a control system and the like including a target signal generating device that generates a target signal and a plurality of oscillation control devices that generate control signals.

BACKGROUND ART

It is said that locomotion of a living organism such as an animal and a human being is generated and controlled by a pattern generator, that is, a neural oscillator CPG (Central Pattern Generator) network that is said to exist in a spinal cord. Hereinafter, a plurality of nonlinear oscillators included in the CPG network are referred to as the CPG in order that the CPG network and the CPG are distinguished from each other.

Many models such as a Matsuoka model have been proposed as a CPG network model, and the CPG network model is applied to real machines (robots) (see Non-Patent Documents 1, 2, and 3). Taga shows that the CPG network and a masculo-skeletal system generate mutual entrainment through sensory input, and Taga performs a simulation of two-legged locomotion. Kimura expands the Taga model to produce a quadruped locomotion robot and realizes some locomotion through irregular terrain by utilizing an ability of entrainment with the CPG network and musclo-skeletal system. As described above, the CPG network is a pattern generator that can explain abilities of irregular ground locomotion and the like which are possessed by a living organism.

The conventional CPG network model is one that simulates a structure and an activity of a nerve. In the conventional CPG network model, the CPGs are mutually connected through connection weights, and the nerve indicating a fatigue degree or the nerve indicating an internal state is designed in one CPG.

On the other hand, a Phaselock Techniques is known as a phase control method in which a phase can be controlled without use of the mutual connection between oscillators. A Phase-Locked Loop (PLL) is a specific example of the Phaselock Techniques and consists of a Phase Detector (PD), a Lowpass Filter (LF), and a Voltage Controlled Oscillator (VCO). A phase difference between two signals is detected in the PD, and a period of the oscillator is controlled in the VCO if needed. Assuming that a control signal is a signal outputted from the VCO while a target signal is a signal that becomes a target, in an operating principle of the PLL, the phase difference between the control signal and the target signal is detected by the PD, the output signal of the PD is inputted to the VCO through the LF, and the period of the control signal is controlled by the VCO until the value of the VCO becomes zero.

Volkovskii et al. propose a CPG network model in which the PLL is used (see Non-Patent Document 4). This CPG network model is not an oscillating system which has a limit cycle, because a sine function is used as the CPG model. Hoppensteadt et al. propose a PLL network model (see Non-Patent Document 5). In this model, a sinusoidal function is used as the VCO, and a model concerning pattern recognition is proposed as application of the PLL network model.

A Van der Pol (VDP) equation is a mathematical model that can describe the theory of vacuum-tube oscillators (see Non-Patent Document 6). There have been proposed some CPG networks in which the VDP equation is used (see Non-Patent Document 7).

[Non-Patent Document 1] K. Matsuoka, "The dynamic model of binocular rivalry", Biological Cybernetics, Vol. 49, pp. 201-208, 1984.
[Non-Patent Document 2] G. Taga and two others, "Self-organized control of bipedal locomotion by neural oscillators in unpredictable environment", Biological Cybernetics, Vol. 65, pp. 147-159, 1991.
[Non-Patent Document 3] H. Kimura and two others, "Adaptive Dynamic Walking of a Quadruped Robot on Natural Ground Based on Biological Concepts", International Journal of Robotics Research, Vol. 26, pp. 475-490, 2007.
[Non-Patent Document 4] A Volkovskii and five others, "Analog electronic model of the lobster pyloric central pattern generator", Journal of Physics, Conference Series, Vol. 23, pp. 47-57, 2005.
[Non-Patent Document 5] Frank C. Hoppensteadt and one other, "Pattern Recognition Via Synchronization in Phase-Locked Loop Neural Networks", IEEE Transactions on neural networks, Vol. 11, No. 3, 2000.
[Non-Patent Document 6] Van der Pol, "On relaxation oscillations", Phil. Mag., No. 2, pp. 987-993, 1926.
[Non-Patent Document 7] Max S. Dutra and two others, "Modeling of a bipedal locomotor using coupled nonlinear oscillators of Van der Pol", Biological Cybernetics, No. 88, pp. 286-292, 2003.

DISCLOSURE OF THE INVENTION

Problems to be Solved by the Invention

However, in order to generate locomotion, it is necessary that the CPG be the oscillator (oscillating system which has a limit cycle: expressed by a nonlinear differential equation of second order or more) having the entrainment ability, and it is necessary that the CPG be able to control a period and an amplitude. The CPG network includes the plurality of CPGs, and it is necessary to control a phase difference between the CPGs. Further, it is necessary that the output values of the finally controlled CPGs be identical to one another in amplitudes and periods.

On the other hand, in the conventional CPG network models described in Non-Patent Documents 1, 2, 3, and the like, the CPGs expressed by a high-order nonlinear differential equation have a network structure in which the CPGs are mutually connected through connection weights. Therefore, an output waveform of each CPG is hardly controlled, which causes a problem in that the connection weights and the network structure are hardly designed. For example, the conventional connection weights are designed using trial and error or a neural network such as a genetic algorithm. However, in any case, an amount of calculation and a processing time become huge. When the CPG network model is mounted on a real machine (robot), it is desirable that the amplitude and period of the output waveform of each CPG and the phase difference between the CPGs are independently controlled.

The VCO corresponds to the CPG when the PLL is applied to the CPG network as described in Non-Patent Document 4. Here, it is assumed that the target signals having the desired phase differences can be designed, and it is assumed that the necessary PLLs are prepared. Then, it seemingly appears that the CPG network can be designed because the signals having arbitrary phase differences can be generated and controlled. However, there is a problem with respect to a PD designing method. That is, the PD designing method is classified into subtraction and multiplication. And the subtraction cannot be applied to the CPG because the sinusoidal wave such as a sine function is used as the VCO in the subtraction. Although periodic waves other than sinusoidal waves can also be used as the VCO in the multiplication, the phase is often controlled while the amplitude of each oscillator deviated. Therefore, the multiplication cannot be applied to the CPG network.

Further, the VDP equation is the oscillating system which has a limit cycle, and the VDP equation is the model in which the amplitude and the period can substantially independently be controlled. Accordingly, it is considered that the VDP equation is suitable to the CPG model. However, the models described in Non-Patent Document 7 and the like are the CPG network that does not retain controllability of the period and the amplitude, which is the feature of the VDP equation.

An object of the present invention is to propose a control system and the like that can realize a CPG network having high controllability.

Means for Solving the Problem

An invention as claimed in Claim 1 relates to a control system comprising a target signal generating device that generates a target signal and a plurality of oscillation control devices that generate control signals, wherein each of the oscillation control devices includes a signal generating means for generating a control signal based on a parameter concerning an amplitude and a parameter concerning a period and a regulating means for regulating the parameter concerning the amplitude and/or the parameter concerning the period based on the target signal and the control signal. Here, "a regulating means for regulating the parameter concerning the amplitude and/or the parameter concerning the period" means that the regulating means regulate either the parameter concerning the amplitude or the parameter concerning the period or both of them. The "and/or" is used in the following in the same way.

The invention according to Claim 2 is the control system according to Claim 1, wherein preferably the regulating means of each of the oscillation control devices is independent of a control signal generated by another oscillation control device.

The invention according to Claim 3 is the control system according to Claim 1 or 2, wherein preferably in an ith (i is a natural number of the number of oscillation control devices or less) oscillation control device, the signal generating means generates a signal $x_i$ based on equation (eq1), and the regulating means regulates $A_i$ and/or $B_i$.

The invention according to Claim 4 is the control system according to any one of Claims 1 to 3, wherein preferably the target signal generating device generates a target signal $X_i$ for the ith (i is a natural number of the number of oscillation control devices or less) oscillation control device based on equation (eq4).

The invention according to Claim 5 is the control system according to any one of Claims 1 to 4, wherein preferably the regulating means regulates the parameter concerning the amplitude and/or the parameter concerning the period based on a phase difference between the target signal and the control signal.

The invention according to Claim 6 is the control system according to any one of Claims 1 to 5, wherein preferably the regulating means includes a difference operation means for calculating a difference between the target signal and the control signal.

An invention as claimed in Claim 7 relates to an oscillation control device comprising a regulating means for independently regulating an amplitude and/or a period of a newly generated control signal based on a predetermined target signal and the generated control signal.

An invention as claimed in Claim 8 relates to a control signal generation method for generating a control signal, the method comprising a regulating step of regulating a parameter concerning an amplitude and/or a parameter concerning a period based on a predetermined target signal and a generated control signal, and a signal generating step of generating a new control signal based on the regulated parameter concerning the amplitude and the regulated parameter concerning the period.

The target signal may be generated so as to satisfy the condition defined by the designer. Particularly, in the invention set forth in claim 4, the combination of constants $C_{i1}$ and $C_{i2}$ of equation (eq4) may automatically be generated so as to satisfy the predetermined condition.

The regulating means of a certain oscillation control device may regulate the amplitude and/or period of the control signal that is to be newly generated based on, for example, the external signal or a control signal of another oscillation control device in addition to the provided target signal.

The present invention may be recognized as a program that realizes the invention set forth in each of the claims in a computer and a recording medium having the program recorded therein.

[Equation 1]

$$\frac{d^2 x_i}{dt^2} - 2\varepsilon(A_i^2 - x_i^2)\frac{dx_i}{dt} + B_i^2 x_i = 0, \tag{eq 1}$$

$$\frac{d^2 x_R}{dt^2} - 2\varepsilon(A^2 - x_R^2)\frac{dx_R}{dt} + B^2 x_R = 0, \tag{eq 2}$$

$$\tau = \frac{\max(x_R)}{\max\left(\frac{dx_R}{dt}\right)} = \frac{2A}{\max\left(\frac{dx_R}{dt}\right)}, \tag{eq 3}$$

$$X_i = c_{i1} x_R + c_{i2} \tau \frac{dx_R}{dt}. \tag{eq 4}$$

where, $A_i$, $B_i$: parameter
  $\varepsilon$: nonlinear ratio
  A, B: parameter, and
  $c_{i1}$, $c_{i2}$: constant.

Effects of the Invention

According to the invention set forth in each of the claims of the present application (hereinafter referred to as the "present invention"), each oscillation control device independently includes the oscillation system, and each oscillation control device can be controlled by the network structure, which allows the realization of the CPG network having the high controllability.

In addition, in the CPG network realized by the present invention, the CPGs are not mutually connected through the weight connection. Therefore, for example, the connection structure of the CPG network can uniquely be designed based on a phase transition diagram in each gait and the like, and therefore the design of the connection weights can be simplified.

In addition, according to claim 3, as the CPG network which is described by the VDP equations holds the feature of the VDP equation, the amplitude, period, and phase difference of the output signal from each CPG can be substantially independently controlled. Therefore, the CPG network realizes the high controllability CPG network in which the amplitude, the period, and the phase difference are easily designed and controlled.

In addition, according to claim 6, the amplitudes, periods, and phases of the target signal (signal that becomes a target) and control signal (signal to control) are aligned through subtraction processing of output value, which allows the realization of the CPG network.

For example, the present invention can be applied to a robot in which a high priority is set on the controllability.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 12 shows the transition of (a) the output signal $x_i$ of each CPG and (b) $b_i$, with a combination of automatically generated $c_{i1}$ and $c_{i2}$.

Figure 1:
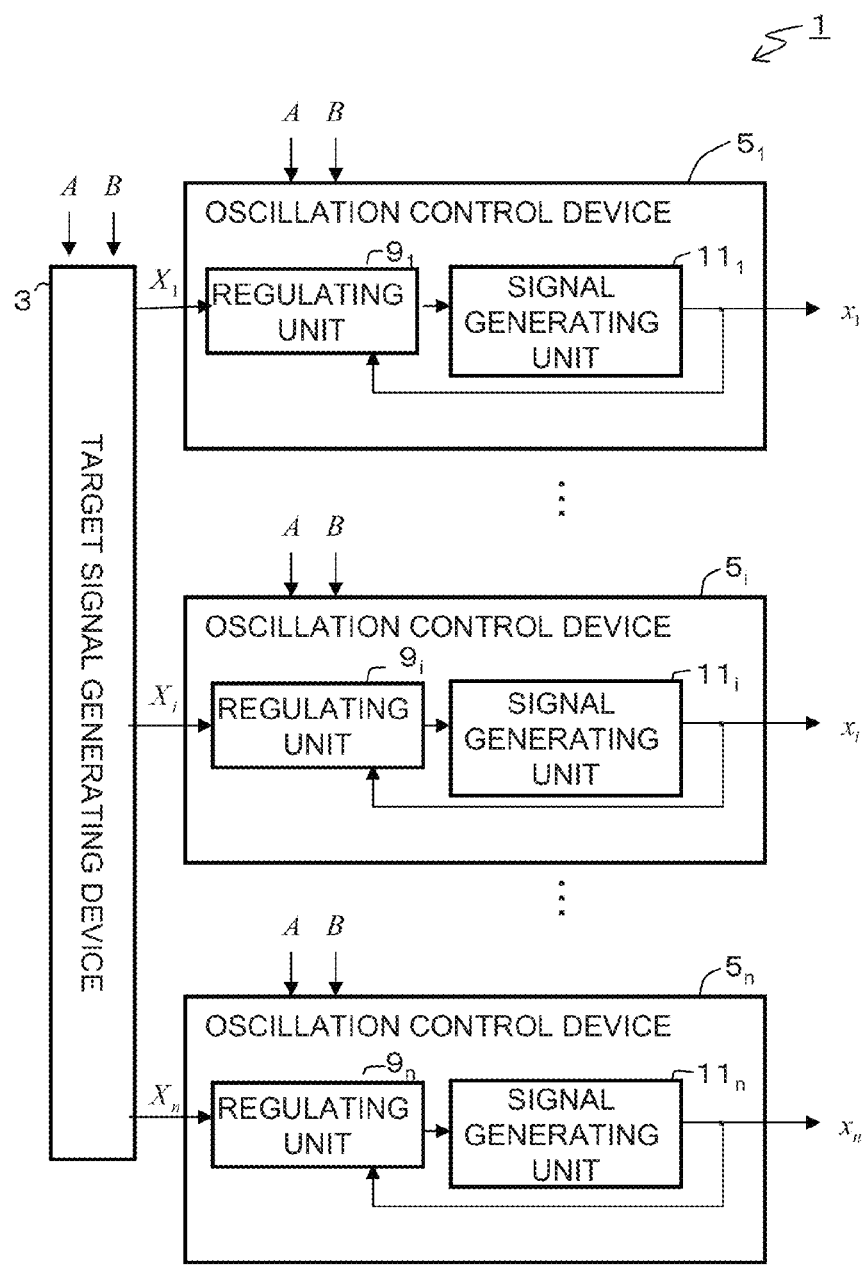
FIG. 1 shows a schematic block diagram illustrating a control system 1 according to an embodiment of the present invention.

DESCRIPTION OF REFERENCE NUMERALS 1 control system
3 target signal generating device
$5_1, \ldots, 5_n$ oscillation control device
$9_1, \ldots, 9_n$ regulating unit
$11_1, \ldots, 11_n$ signal generating unit
21 $CPG_i$
23 regulating unit
25 $VDP_i$
31 RG
33 $VDP_R$
43 target signal generating device
$47_1, \ldots, 47_n$ oscillation control device
$51_i$ oscillation control device
$53_i$ regulating unit
$55_i$ signal generating unit

BEST MODE FOR CARRYING OUT THE INVENTION

Embodiments of the present invention will be described below with reference to the drawings.

First Embodiment

FIG. 1 shows a schematic block diagram illustrating a control system 1 according to an embodiment of the present invention.

The control system 1 includes a target signal generating device 3 that generates a target signal, and n oscillation control devices $5_1, \ldots, 5_n$ that generate control signals.

In the embodiment, the target signal generating device 3 and the oscillation control devices $5_1, \ldots, 5_n$ are designed with a VDP equation. First, the VDP equation will be described.

The VDP equation, proposed by Van der Pol in 1926, describes the theory of vacuum-tube oscillators (see Non-Patent Document 6). The VDP equation is one of the simplest models of oscillating systems which have limit cycles, and the VDP equation is expressed by equation (1).

Here, A and B are parameters. $\epsilon$ indicates a nonlinear ratio, When the parameter $\epsilon$ is small ($0<\epsilon\ll 1$), the solution of the VDP equation is a sustained sinusoidal oscillation. In the case of $\epsilon=0$, the VDP equation becomes a harmonic oscillator. According to an approximation method (see Luis A. Pipes and one other, "Mathematics for engineers and physicists", McGrawHill Education, Third Edition, 1970) proposed by Kryloff and Bogoliuboff, a solution of the harmonic oscillator can be expressed by equation (2) using a and $\phi$. Equation (3) and equation (4) are obtained using a solution of Kryloff and Bogoliuboff.

As can be seen from equation (3), an amplitude of an output value of the VDP equation reaches a stable state in the case of $da/dt=0$, and the amplitude becomes $a=2A$. In an actual simulation, however, the amplitude does not always exactly become 2 A. This is because the approximation is used in this solution.

As can be seen from equation (4), a phase of the output value of the VDP equation does not depend on time.

When a and $\phi$ are constant, it can be seen from equation (2) that a period of an output waveform of the VDP equation can be controlled by the parameter B.

Therefore, according to equation (2) and equation (3), for arbitrary constants a and φ, the amplitude and period of the output value of the VDP equation can be independently controlled by the parameters A and B, respectively, the period is inversely proportional to the parameter B, and the amplitude becomes 2 A.

Figure 2A:
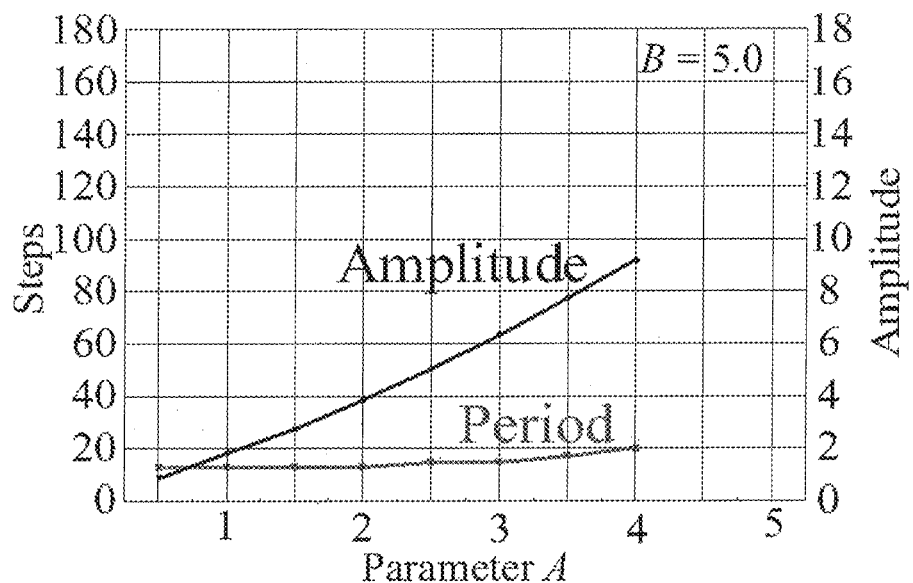
FIG. 2 illustrates simulation results in which an amplitude and a period of an output waveform of a VDP equation are measured.
Figure 2B:
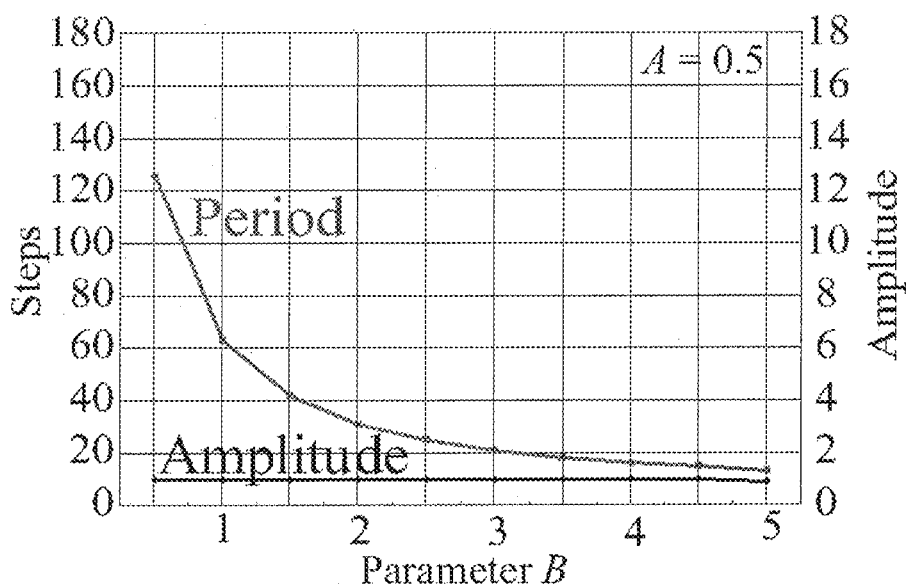

FIG. 2 illustrates simulation results in which the amplitude and period of the output waveform of the VDP equation are measured. ε=0.2 is used, and x=0.5 and dx/dt=0.1 are used as initial values. The VDP equation operated as the damped oscillation in the case of A=0. Oscillatory solution are always obtained from the VDP equation in the range of A<B. As can be seen from FIG. 2, the amplitude and period of the output waveform of the VDP equation can independently be controlled by the parameters A and B. As described above, the VDP equation has a limit cycle, and has the independent controllability of the amplitude and period. Therefore, the VDP equation is useful for designing the CPG network having independent controllability.

Referring to FIG. 1, based on the parameters A and B obtained from the outside, the target signal generating device 3 generates a target signal $X_i$ for the oscillation control device $5_i$ (i is a natural number equal to n or less) by using the VDP equation. In order to align the amplitudes and periods of the oscillation control devices $5_i$, amplitude and period control terms of the VDP equations are uniformly controlled by the target signals $X_i$. By this processing, the CPG network in which the waveforms can uniformly be controlled according to an external change can be designed.

The parameters A and B are externally provided to the oscillation control device $5_i$, and the oscillation control device $5_i$ generates a control signal $x_i$ from equation (5) based on parameters $A_i$ and $B_i$ obtained by regulating the parameters A and B. The signal control device $5_i$ includes a regulating unit $9_i$ and a signal generating unit $11_i$. The regulating unit $9_i$ regulates at least one of the parameters $A_i$ and $B_i$ based on the target signal $X_i$ and the generated control signal $x_i$. The signal generating unit $11_i$ newly generates a control signal $x_i$ based on the parameter regulated by the regulating unit $9_i$.

In FIG. 1, the oscillation control devices $5_i, \ldots, 5_n$ are independent of one another and generate control signals using target signals $X_1, \ldots, X_n$ respectively, generated by the target signal generating device 3. In each of the oscillation control devices $5_1, \ldots, 5_n$, the amplitude and period of the control signal to be generated can substantially independently be regulated. Therefore, for example, in realizing a gait, each leg can independently be controlled by providing the oscillation control device corresponding to each leg, and the control system 1 can deal with the arbitrary number of legs such as two legs and three legs. Thus, the control system 1 can deal with the change of the number of oscillation control devices, and the present invention can realize a robust system. Such a system can be realized by focusing on the nature of motion such as gaits.

[Equation 2]

$$\frac{d^2 x}{dt^2} - 2\varepsilon(A^2 - x^2)\frac{dx}{dt} + B^2 x = 0, \quad (1)$$

$$x = a\sin(Bt + \phi), \quad (2)$$

$$\frac{da}{dt} = a\varepsilon\left(A^2 - \frac{a^2}{4}\right), \quad (3)$$

$$\frac{d\phi}{dt} = 0, \quad (4)$$

$$\frac{d^2 x_i}{dt^2} - 2\varepsilon(A_i^2 - x_i^2)\frac{dx_i}{dt} + B_i^2 x_i = 0. \quad (5)$$

The design of the oscillation control device $5_i$ in which the VDP equation is used will specifically be described below. More generally, the case where only the parameter $B_i$ concerning the period is regulated in designing n CPGs (corresponding to oscillation control devices $5_i$ of FIG. 1), in which the VDP equation is used, constituting the CPG network (corresponding to the control system 1 of FIG. 1) will specifically be described. In other words, in the following description, it is assumed that the parameter $A_i$ concerning the amplitude in each CPG is not regulated and is equal to the externally provided parameter A. As described above, in the present invention, only the parameter concerning the period may be regulated and both of the parameters are not necessarily regulated.

Figure 3:
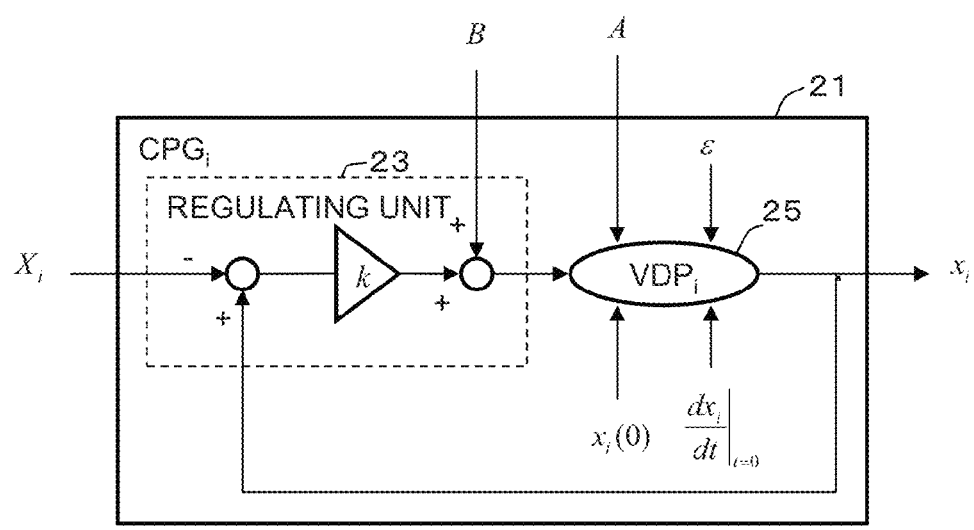
FIG. 3 shows a block diagram illustrating a $CPG_i$ 21 (corresponding to oscillation control devices $5_1, \ldots, 5_n$ of FIG. 1), which is a proposed CPG model.
Figure 4A:
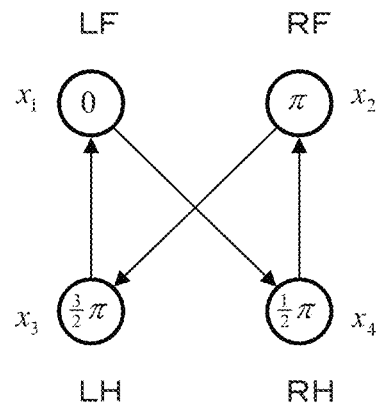
FIG. 4 illustrates phase transitions in typical gaits of quadruped locomotion animal.
Figure 4B:
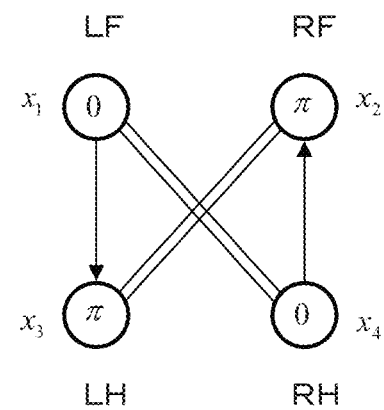
Figure 4C:
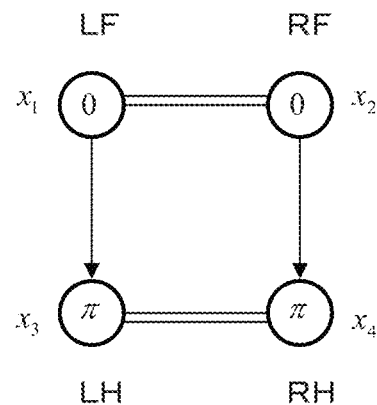
Figure 4D:
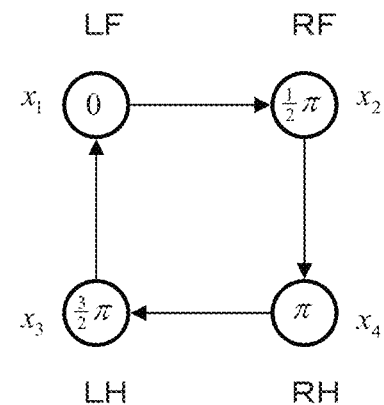

FIG. 3 shows a block diagram illustrating a $CPG_i$ 21, which is a proposed CPG model. The $CPG_i$ 21 includes a regulating unit 23 corresponding to the regulating unit $9_i$ of FIG. 1 and a $VDP_i$ 25 corresponding to the signal generating unit $11_i$ of FIG. 1.

A VDP equation ($VDP_i$) of an ith $CPG_i$ is expressed by equation (6).

In this embodiment, the following method is used in order that a phase difference between the CPGs is controlled keeping the controllability of the amplitude and period, which is the feature of the VDP equation. It is assumed that the signal having the desired phase difference from that of the output value $x_i$ of each CPG is the target signal $X_i$ and $X_i$ is known. A method will be described in which the period of the $CPG_i$ is tentatively controlled so that the phase difference between $x_i$ and $X_i$ becomes zero, thereby controlling the phase difference between the CPGs.

The difference between $x_i$ and $X_i$ is calculated, and only the period of each CPG is controlled so that the difference becomes zero. This operation can be expressed by equation (7). Here, $b_i$ is a parameter that tentatively controls the period of the output waveform of the ith $CPG_i$ and k is a coefficient that is used to determine how much the difference between $x_i$ and $X_i$ is reflected in the period control. In the following description, it is assumed that the coefficient k is always set to 1.

Next, the parameter $B_i$ (parameter concerning the period) of the $CPG_i$ expressed by equation (6) is controlled using $b_i$ in equation (8). Regarding the physical meaning of equation (8), the parameter B indicates a natural frequency of each CPG while the parameter $b_i$ indicates a phase deviation of the target signal $X_i$ to the output waveform $x_i$ of the ith $CPG_i$.

The processing expressed by equations (7) and (8) is repeated until the difference between $x_i$ and $X_i$ is eliminated. Through this processing, when the target signal $X_i$ is known, the output value $x_i$ can be generated as a signal having the phase identical to that of the target signal $X_i$, that is, the phase between the CPGs can be controlled.

[Equation 3]

$$\frac{d^2 x_i}{dt^2} - 2\varepsilon(A^2 - x_i^2)\frac{dx_i}{dt} + B_i^2 x_i = 0, \quad (6)$$

-continued $$b_i = k(x_i - X_i), \quad (7)$$

$$B_i = B + b_i. \quad (8)$$

The design of the target signal generating device 3 (oscillator that generates the target signal, hereinafter the oscillator is referred to as the rhythm generator (RG)) in which the VDP equation is used will specifically be described.

In order to set a unique target signal to each CPG, it is necessary to define the gait to be designed. In this embodiment, typical gait signals of the quadruped locomotion animal are generated as illustrated in FIG. 4. FIG. 4 illustrates phase transitions in typical gaits of the quadruped locomotion animal. FIG. 4($a$) illustrates the phase transition diagram in a walk mode, FIG. 4($b$) illustrates the phase transition diagram in a trot mode, FIG. 4($c$) illustrates the phase transition diagram in a bound mode, and FIG. 4($d$) illustrates the phase transition diagram in a gallop mode. In FIG. 4, the letters LF, RF, LH, and RH denote a left foreleg, a right foreleg, a left hind leg, and a right hind leg, respectively. The arrow and equal sign indicate the direction of the phase difference, and in phase, respectively.

As can be seen from FIG. 4, only four types of the phase differences of 0, $\pi/2$, $\pi$, and $3\pi/2$ exist between the CPGs that should be controlled. A method for generating the target signal for expressing the phase difference will be described.

As described above in equation (7), $x_i - X_i = 0$ is required as a condition of the target signal after the phase difference between the output value $x_i$ and the target signal $X_i$ of each CPG becomes zero. Besides, it is necessary that the target signals with the waveforms having the four types of phase differences of 0, $\pi/2$, $\pi$, and $3\pi/2$ from the phase of one reference signal are generated.

A method for designing the rhythm generator with the VDP equation will be described.

Figure 5:
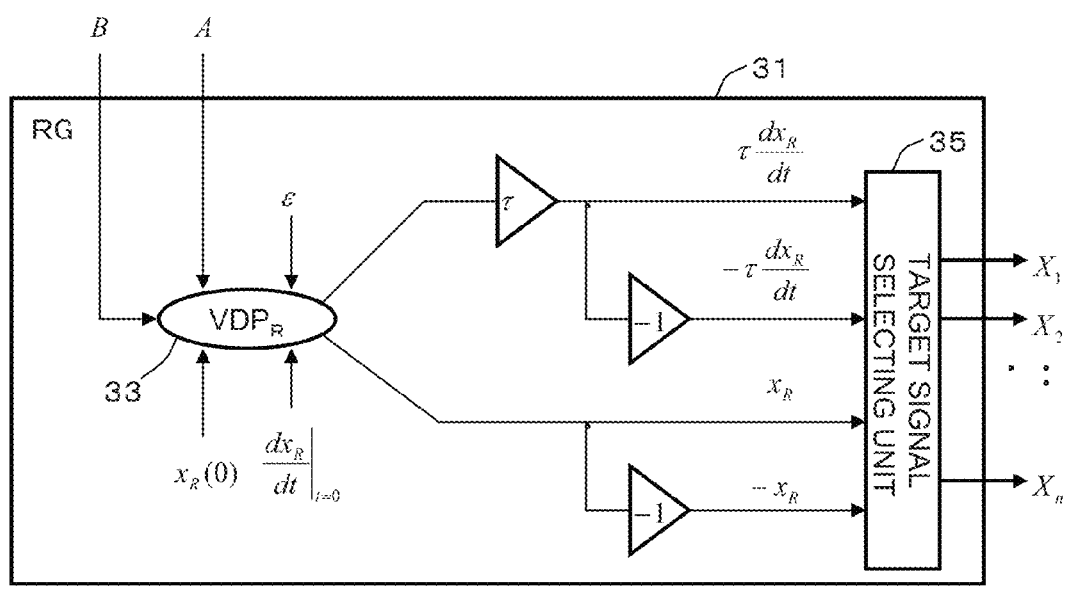
FIG. 5 shows a block diagram illustrating an RG 31 (corresponding to target signal generating device 3 of FIG. 1), which is a proposed rhythm generator.
Figure 6A:
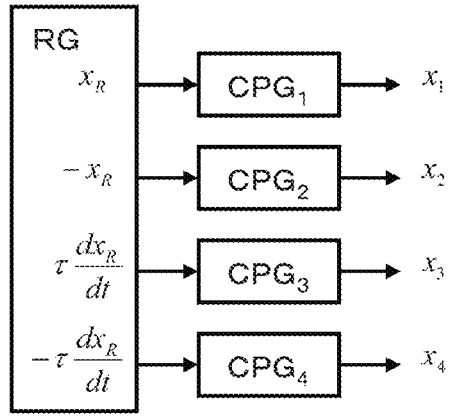
FIG. 6 illustrates an example of a CPG network structure configured to generate four kinds of gaits.
Figure 6B:
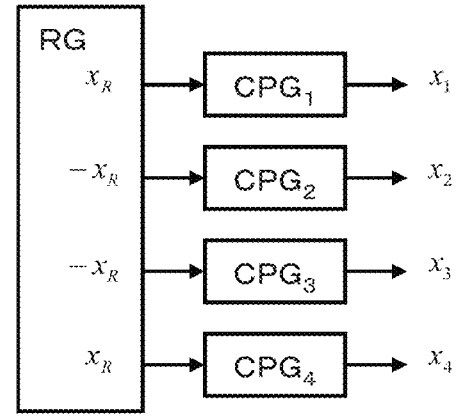
Figure 6C:
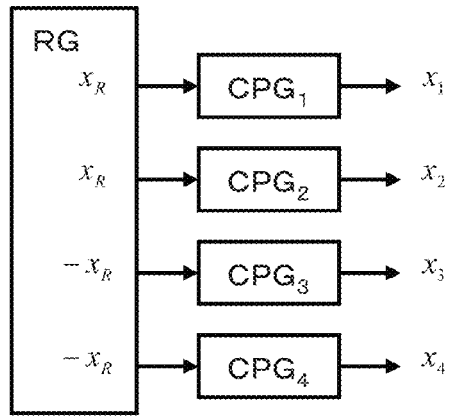
Figure 6D:
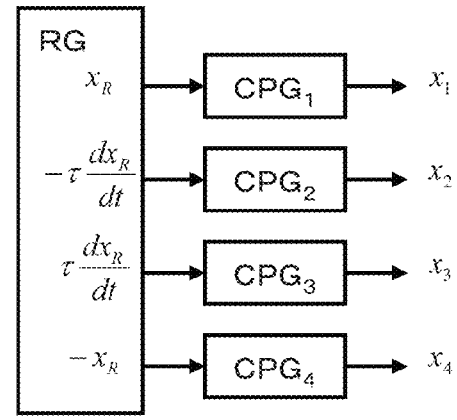

FIG. 5 shows a block diagram illustrating an RG 31, which is the proposed rhythm generator. In FIG. 5, a VDP$_R$ 33 is the VDP equation constituting the RG, and an output signal of the VDP$_R$ 33 is expressed with a subscript R. As the RG is also designed using the VDP equation, the target signal $X_i$ can be formed by using $\pm x_R$ and $\pm \tau dx_R/dt$ which are calculated in the VDP equation. Therefore, it is possible to express the four types of the phase differences described above from the phase of the reference signal $x_R$. For example, letting $X_1 = X_R$ and $X_2 = \tau dx_R/dt$ leads to the phase difference of $\pi/2$ between $x_1$ and $x_2$ after the control. Here, it is assumed that the VDP equation is used within a range where the VDP equation has oscillatory solutions.

In FIG. 5, based on the phase transition diagram in each gait of FIG. 4, the target signal selecting unit 35 selects one output value $X_i$ from the four inputted signals for each of the n CPGs. The values identical to those of the parameters A and B are inputted to each CPG, and one of $\pm \tau dx_R/dt$ and $\pm x_R$ selected by the target signal selecting unit 35 is used as the target signal $X_i$. This processing is expressed by a mathematical expression in equation (9).

Here, in this embodiment, $c_{i1}$ and $c_{i2}$ take 0, −1, or 1. Additionally one of $c_{i1}$ and $c_{i2}$ always takes zero, and $c_{i1}$ and $c_{i2}$ do not become zero at the same time. $\tau$ in equation (9) has two roles. One of the roles is a time constant to match necessarily the dimension of $X_i$ expressed by one of $x_R$ and $dx_R/dt$ with the dimension of $x_R$. The other role is to adjust the amplitudes of the output waveforms of $dx_R/dt$ to always keep the relationship of the amplitudes of $x_R$ and $dx_R/dt$ constant even if the parameter A and B change. This is to deal with the circumstances that the amplitudes of the output waveforms of the $x_R$ and $dx_R/dt$ are different, which can occur depending on the parameters A and B. Therefore, $\tau$ is calculated by equation (10). The max function indicates the amplitudes of the output waveform $x_R$ and $\tau dx_R/dt$. The amplitude of the output waveform $x_R$ becomes 2 A in theory.

[Equation 4]

$$X_i = c_{i1} x_R + c_{i2} \tau \frac{dx_R}{dt}, \quad (9)$$

$$\tau = \frac{\max(x_R)}{\max\left(\frac{dx_R}{dt}\right)} = \frac{2A}{\max\left(\frac{dx_R}{dt}\right)}. \quad (10)$$

The RG and each CPG are designed using the VDP equation. The structure of each CPG differs from the structure of the RG in that a feedback signal from a sensor mounted on the actual robot and the target signal $X_i$ are inputted.

In this embodiment, although attention is paid to the Phaselock Techniques in order to solve the problem of mutual connection and connection weights of the conventional CPG network, subtraction processing of output values of the two oscillators is performed in order to align the amplitudes and phases of the two oscillators in this embodiment. The output value of the subtraction processing becomes zero when the amplitudes and phases of the target signal are equal to those of the control signal. However, the output value of the subtraction processing is not always proportional to the phase difference between the two oscillators. Therefore, the operation of the subtraction is not functional equivalent of the PD. That is, the Phaselock Techniques in which the subtraction processing is performed is not the PLL.

Next, the design of the CPG network for the quadruped locomotion animal will be described below with reference to the CPG$_i$ of FIG. 3 and the RG of FIG. 5.

FIG. 6 illustrates an example of a CPG network structure configured to generate four kinds of gaits. FIG. 6($a$) illustrates the CPG network structure in the walk mode, FIG. 6($b$) illustrates the CPG network structure in the trot mode, FIG. 6($c$) illustrates the CPG network structure in the bound mode, and FIG. 6($d$) illustrates the CPG network structure in the gallop mode.

First, one RG and the necessary number (n) of CPGs are prepared. In this embodiment, the four (n=4) CPGs are required because the locomotion signals for the quadruped locomotion are generated and controlled. The parameters A and B are inputted to the RG and each CPG in order to determine the amplitude and the period.

The output signal of each CPG is allocated as the control signal to each leg. In this embodiment, the CPG$_1$, CPG$_2$, CPG$_3$, and CPG$_4$ are made correspondent to the LF, RF, LH, and RH, respectively.

The target signal $X_i$ of each CPG is determined based on the phase transition diagram in each gait of FIG. 4. A method for determining $X_i$ ($1 \leq i \leq n$) in the walk mode will be described below.

Because $x_i$ corresponds to LF which works as the reference signal for calculating the phase difference between CPG$_1$ and the other CPGs, $x_R$ is selected as the target signal $X_1$.

Because $x_2$, $x_3$, and $x_4$ correspond to RF, LF and RH having the phase differences of $\pi$, $3\pi/2$, and $\pi/2$, respectively, relative to LF, $-x_R$, $\tau dx_R/dt$, and $-\tau dx_R/dt$ are inputted as the target signals $X_2$, $X_3$, and $X_4$, respectively.

When the CPG network in the walk mode is compared with equation (9), $c_{11}=1$, $c_{21}=-1$, $c_{31}=0$, $c_{41}=0$, $c_{12}=0$, $c_{22}=0$, $c_{32}=1$, and $c_{42}=1$ are obtained. Similarly, the network can uniquely be designed for the trot, bound, and gallop modes based on the phase transition diagram in each gait. Table 1 collectively shows the combinations of $c_{i1}$ and $c_{i2}$ in each gait.

TABLE 1

| | | walk | | trot | | bound | | gallop | |
|---|---|---|---|---|---|---|---|---|---|
| i | $x_i$ | $c_{i1}$ | $c_{i2}$ | $c_{i1}$ | $c_{i2}$ | $c_{i1}$ | $c_{i2}$ | $c_{i1}$ | $c_{i2}$ |
| 1 | $x_1$ | 1 | 0 | 1 | 0 | 1 | 0 | 1 | 0 |
| 2 | $x_2$ | -1 | 0 | -1 | 0 | 1 | 0 | 0 | -1 |
| 3 | $x_3$ | 0 | 1 | -1 | 0 | -1 | 0 | 0 | 1 |
| 4 | $x_4$ | 0 | -1 | 1 | 0 | -1 | 0 | -1 | 0 |

Figure 7:
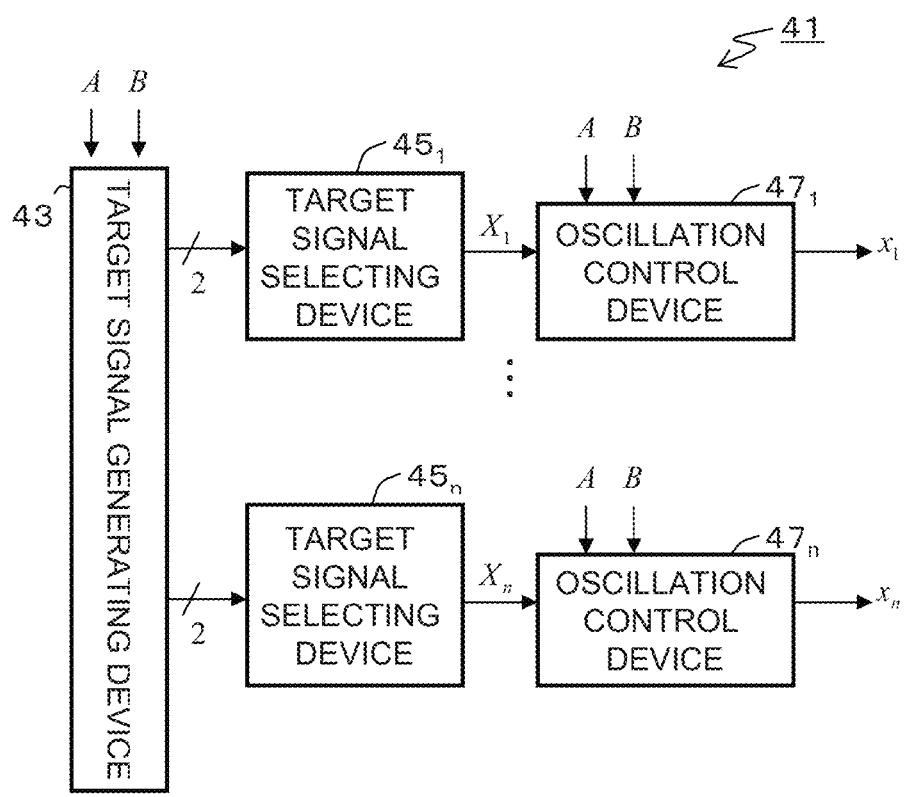
FIG. 7 is a schematic block diagram illustrating a control system 41 according to another embodiment of the present invention.
Figure 10A:
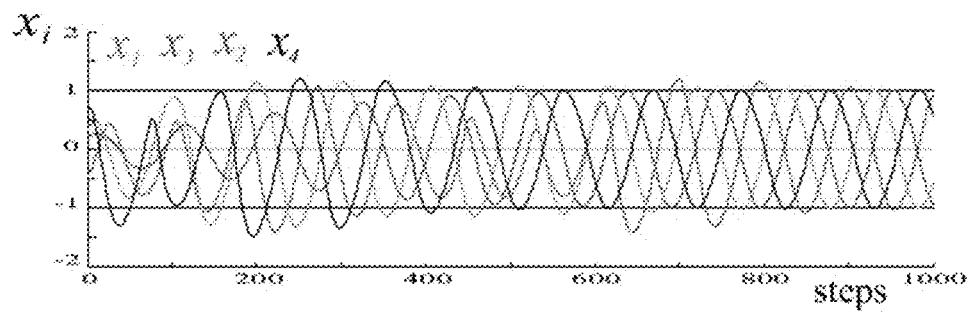
FIG. 10 shows the transition of the output signal $x_i$ of each CPG with various parameter arrangements of A and B in the walk mode.
Figure 10B:
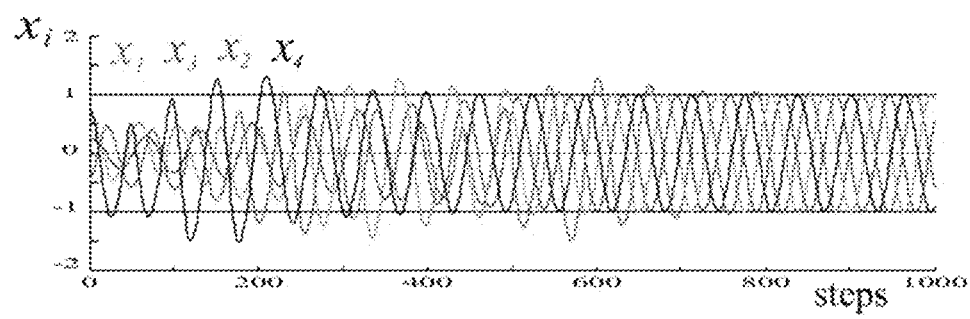
Figure 10C:
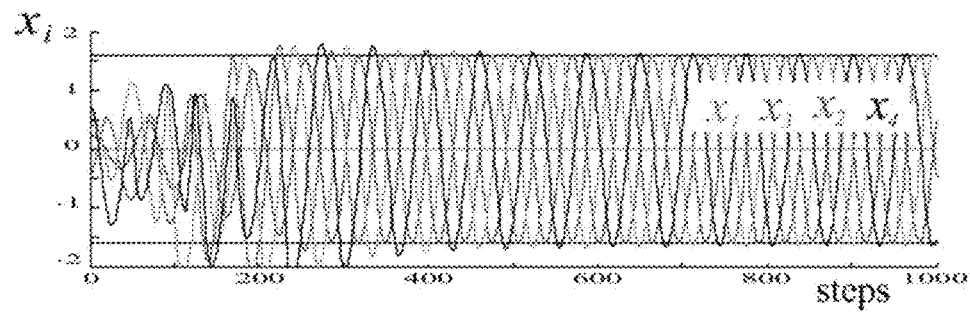
Figure 11A:
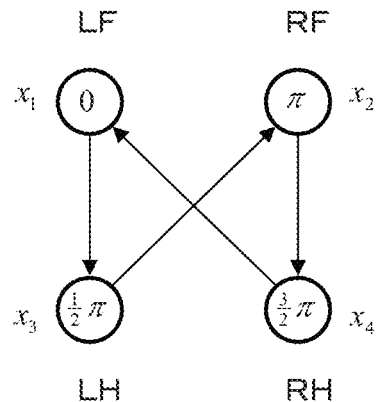
FIG. 11 illustrates phase transition diagrams in gaits of modes except for the walk, trot, bound, and gallop modes. These gates simultaneously satisfy a condition of the walk, trot, bound, and gallop modes in FIG. 4 and a condition obtained based on some constraints which are derived by biological gaits.
Figure 11B:
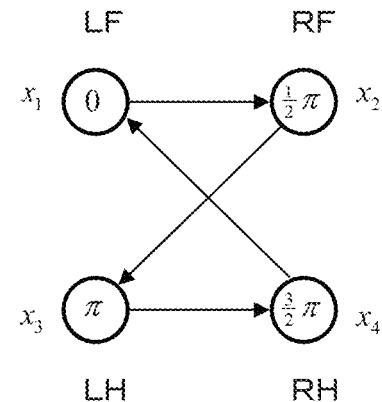
Figure 11C:
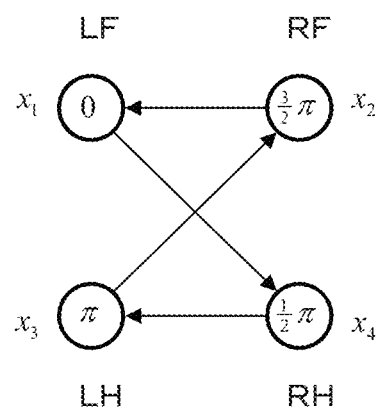
Figure 11D:
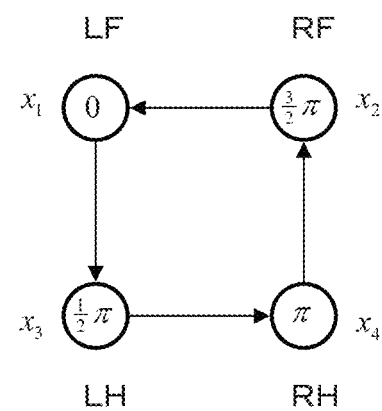

FIG. 7 is a schematic block diagram illustrating a control system 41 according to another embodiment of the present invention. As illustrated in FIG. 10, for example, a target signal generating device 43 may be the device which generates basic signals $x_R$ and $\tau dx_R/dt$ based on the VDR equation. A target signal selecting device $\mathbf{45}_i$ may be the device which perform the calculation of equation (9) for the signal $x_R$ and $\tau dx_R/dt$ using the constants $c_{i1}$ and $c_{i2}$. And n oscillation control devices $\mathbf{47}_i$ may be the device which generate the output signal $x_i$ based on the signals selected by the target signal selecting device $\mathbf{45}_i$.

As still another embodiment, referring to FIG. 7, the target signal generating device 43 may be the device which generates the signals (for example, four signals $x_R$, $-x_R$, $\tau dx_R/dt$, and $-\tau dx_R/dt$) necessary for each of the oscillation control devices $\mathbf{47}_i$, and the target signal selecting device $\mathbf{45}_i$ may be the device which select one signal from the signals if necessary.

Thus, the target signal generating device (rhythm generator) may be recognized as one that generates the basic signal as illustrated in FIG. 7 (in the embodiment described above, two-signal type of $x_R$ and $\tau dx_R/dt$), the target signal generating device may be recognized as one that includes a portion that performs operation of multiplication by −1 to the basic signal to generate the necessary signal (in the embodiment described above, four-signal type), and further the target signal generating device may be recognized as one that includes a portion that specifies the signal to be provided to each oscillation control device (CPG) as illustrated in FIG. 5 (in the embodiment described above, n-signal type).

Second Embodiment

Next, referring to FIGS. 8, 9, and 10, effectiveness of the proposed model will be described by simulations in which Matlab is used. A 4th order Runge-Kutta method is used as the solution of the nonlinear differential equation.

Figure 8A:
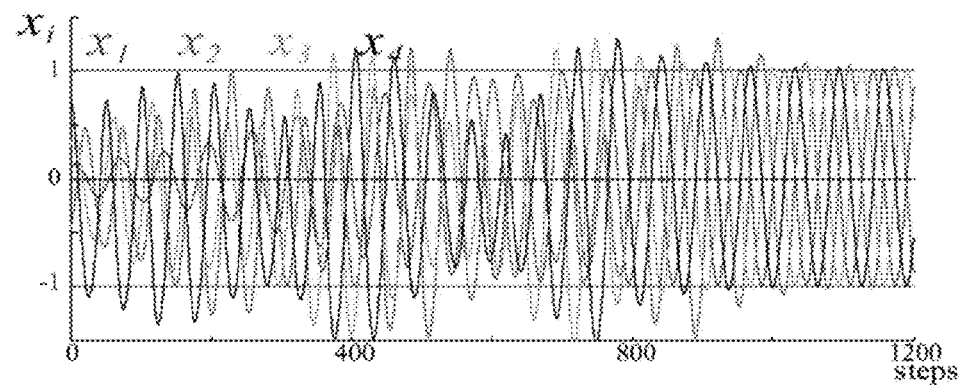
FIG. 8 illustrates transitions of output signals $x_i$ and $b_i$ of each CPG in a walk mode.
Figure 8B:
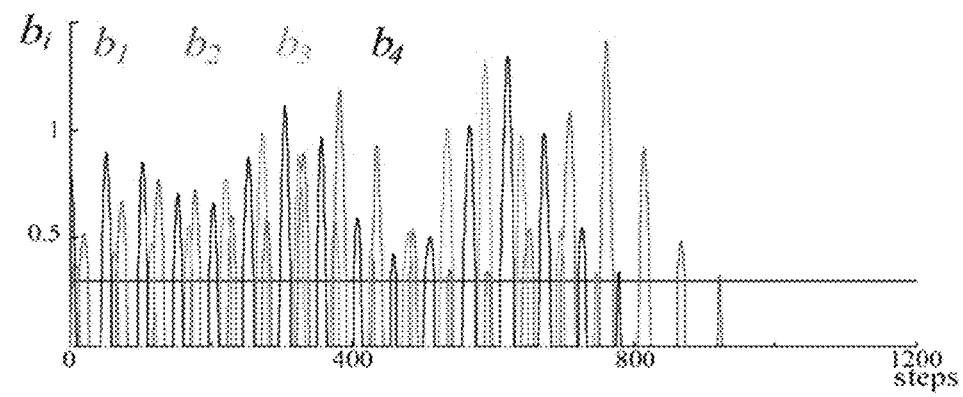

FIG. 8 shows the simulation results of the transitions of the output signals $x_i$ and $b_i$ of each CPG in the walk mode. FIG. 8(*a*) illustrates the transition of the output signal $x_i$ of each CPG, and FIG. 8(*b*) illustrates the transition of $b_i$. $\epsilon=0.2$ and $k=1$ are used, and $x_R=0.1$, $x_1=0.1$, $x_2=-0.5$, $x_3=0.3$, $x_4=0.7$, $dx_R/dt=0.1$, $dx_1/dt=0.1$, $dx_2/dt=0.3$, $dx_3/dt=0.3$, and $dx_4/dt=0.2$ are used as initial values. $A=0.5$ and $B=1$ are used as the parameters to determine the amplitude and the frequency. $b_i$ indicates the phase deviation of $x_i$ from the phase of the target signal $X_i$. In these simulations, the operation in which the value of $b_i$ of 0.3 or less was omitted was added. The reason why this processing is performed is that $b_i$ in equation (8) does not always completely fall to zero, depending on the parameters A and B, even after the phases of $x_i$ and $X_i$ are synchronous with each other. As can be seen from the output result, the period of each CPG is controlled by $b_i$ so that the phase difference between the output waveforms of the CPGs becomes $\pi/2$. As can also be seen from the output result, $b_i$ becomes zero after the output value of each CPG is controlled in each target signal.

Figure 9A:
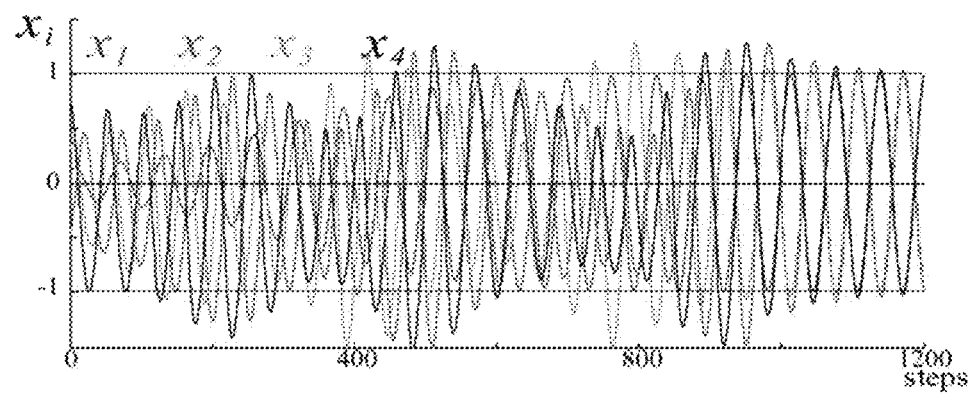
FIG. 9 shows the transition of the output signal $x_i$ of each CPG. Fig. (a), (b) and (c) show trot mode, bound mode, and gallop mode, respectively.
Figure 9B:
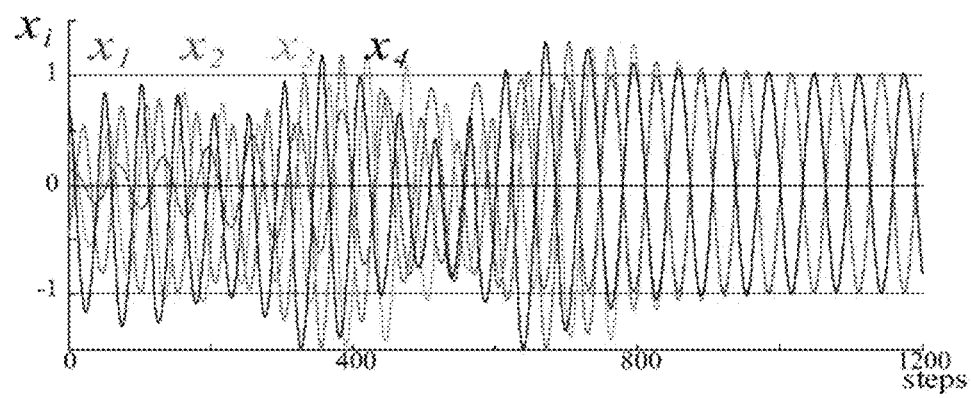
Figure 9C:
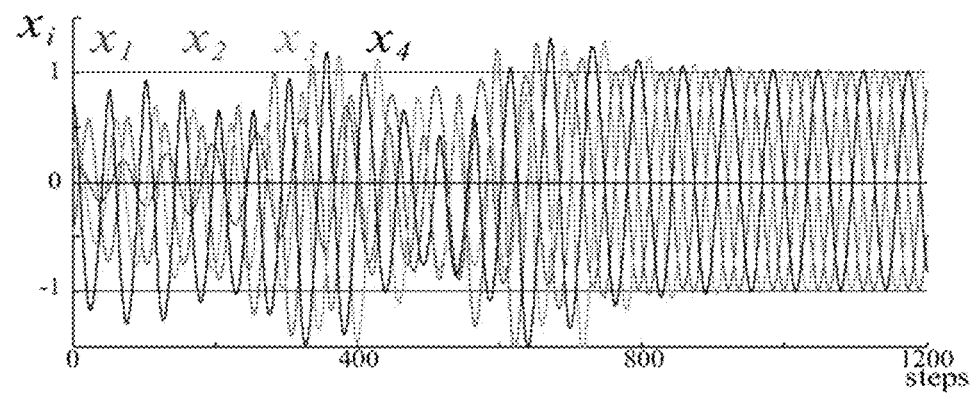

FIG. 9 shows the transition of the output signal $x_i$ of each CPG. Fig. (a), (b) and (c) show trot, bound, and gallop modes, respectively. FIG. 9(*a*) illustrates the simulation result in the trot mode, FIG. 9(*b*) illustrates the simulation result in the bound mode, and FIG. 9(*c*) illustrates the simulation result in the gallop mode. $\epsilon$, k, A, B, and the initial values of $x_R$, $dx_R/dt$, $x_i$, and $dx_i/dt$ are the same with those of the simulation conditions in the walk mode. As can be seen from FIG. 9, the signals having the phase differences identical to those of the phase transition diagram in each gait of FIG. 4 are generated and controlled. The identical parameters A and B are used in the output results of FIG. 8(*a*), FIG. 9(*a*), FIG. 9(*b*), and FIG. 9(*c*), so that the amplitudes and the periods are identical in each gait. Regarding the output values, it can also be seen that the waveforms ($x_2$, $x_3$, and $x_4$) having the desired phase differences relative to $x_1$ that is the output value of the $CPG_1$ are generated and controlled.

FIG. 10 illustrates experimental result in the walk mode under several values of A and B. FIG. 10(*a*) illustrates the experimental result in the case of $A=0.5$ and $B=0.6$, FIG. 10(*b*) illustrates the experimental result in the case of $A=0.5$ and $B=1$, and FIG. 10(*c*) illustrates the experimental result in the case of $A=0.8$ and $B=1$. The above-described values are used as $\epsilon$, k, and the initial values of $x_R$, $dx_R/dt$, $x_i$, and $dx_i/dt$. As can be seen from FIG. 10, the amplitude and the period of the output waveform of each CPG can be independently controlled even in the network structure. Besides, as described above, it can be seen that the amplitude of the output waveform of the VDP equation reaches double of the parameter A while the period is inversely proportional to the parameter B. Thus, it can be seen that the amplitude and period of the output waveform can be independently controlled by the parameters A and B. The measured result of a period T of each signal is (a) 105 (steps), (b) 62 (steps), and (c) 63 (steps).

As described above, in this embodiment, each CPG constituting the CPG network has a limit cycle, and only the phase difference between the CPGs is controlled by the RG. Further, each CPG is expressed using the VDP equation, which is the nonlinear differential equation where the amplitude and frequency of the output value can substantially independently be controlled. Therefore, the CPG network having the high controllability can be designed.

Third Embodiment

Another target signal selecting device (see the target signal selecting unit 35 of FIG. 5 and the target signal selecting devices $\mathbf{45}_1, \ldots, \mathbf{45}_n$ of FIG. 7) of another embodiment will be described below.

The gait satisfying a certain condition can freely be switched by freely selecting the combination of coefficients $c_{i1}$ and $c_{i2}$ of equation (9) under the condition. Therefore, some rules are found from the combinations of $c_{i1}$ and $c_{i2}$ of the typical gaits (for example, see FIG. 4 and Table 1) and these rules are set as the conditions.

An example of the rules will be described with reference to Table 1. $x_1$ is fixed as the reference signal ($c_{11}=1$ and $c_{12}=0$). From Table 1, the summation of $c_{i1}$ and the summation of $c_{i2}$ become zero ($\Sigma c_{i1}=\Sigma c_{i2}=0$). The sum of $c_{i1}$ and $c_{i2}$ becomes 1 or −1 ($c_{i1}+c_{i2}=1$ or −1). Therefore, as described later, three conditions are produced based on constraints (the following condition 1 and condition 2) in the CPG network and a constraint (condition 3) in the gait of the living organism, and the target signal selecting device determines the combination of $c_{i1}$ and $c_{i2}$ under the conditions.

The first condition (condition 1) is that the sum of all the generated waveforms is zero ($\Sigma c_{i1} = \Sigma c_{i2} = 0$). The second condition (condition 2) is that $x_i$ and $dx_i/dt$ are not connected at the same time ($c_{i1} + c_{i2} = 1$ or $-1$). The third condition (condition 3) is that the foreleg and the hind leg on the identical side do not become in phase ($c_{21} \neq c_{41}$ and $c_{31} \neq 1$).

Four gaits simultaneously satisfying these three conditions exist except the walk, trot, bound, and gallop modes (see FIG. 4 and Table 1). Table 2 illustrates the combinations of $c_{i1}$ and $c_{i2}$ of the four gaits except the walk, trot, bound, and gallop modes. FIG. 11 illustrates transition diagrams in the gaits of modes except for the walk, trot, bound, and gallop modes illustrated in FIG. 4.

Therefore, there are eight types of parameter sets satisfying the three conditions, and the gaits satisfying the conditions defined by the designer can be obtained.

TABLE 2

| i | $x_i$ | gait 1 | | gait 2 | | gait 3 | | gait 4 | |
|---|---|---|---|---|---|---|---|---|---|
| | | $c_{i1}$ | $c_{i2}$ | $c_{i1}$ | $c_{i2}$ | $c_{i1}$ | $c_{i2}$ | $c_{i1}$ | $c_{i2}$ |
| 1 | $x_1$ | 1 | 0 | 1 | 0 | 1 | 0 | 1 | 0 |
| 2 | $x_2$ | -1 | 0 | 0 | -1 | 0 | 1 | 0 | 1 |
| 3 | $x_3$ | 0 | -1 | -1 | 0 | -1 | 0 | 0 | -1 |
| 4 | $x_4$ | 0 | 1 | 0 | 1 | 0 | -1 | -1 | 0 |

Referring to FIG. 12, the effectiveness of the proposed model is illustrated by a simulation. The experiment and simulation has been conducted under the conditions that the combination of $c_{i1}$ and $c_{i2}$ simultaneously satisfying the conditions 1, 2, and 3 is generated using a random number. Here, the random number is selected from -1, 0, and 1. The CPG network structure is changed by generating the random number every 1500 step.

FIG. 12 shows the transition of (a) the output signal $x_i$ of each CPG and (b) $b_i$, with a combination of automatically generated $c_{i1}$ and $c_{i2}$. In FIG. 12, a horizontal axis indicates the number of steps. The automatically generated combination of $c_{i1}$ and $c_{i2}$ corresponds to gallop mode up to 1500 steps, the mode of gait 4 in the range of 1501 to 3000 steps, and the trot mode in the range of 3001 to 4500 steps. As can be seen from FIG. 12, the gait satisfying the specified condition can automatically be generated. By using the eight types of signals generated under the conditions, stable locomotions can be expected because one leg moves while the other three legs always stand on the ground. Therefore, these signals controlled by these phase relationships can be regarded as the gaits.

Fourth Embodiment

Figure 13:
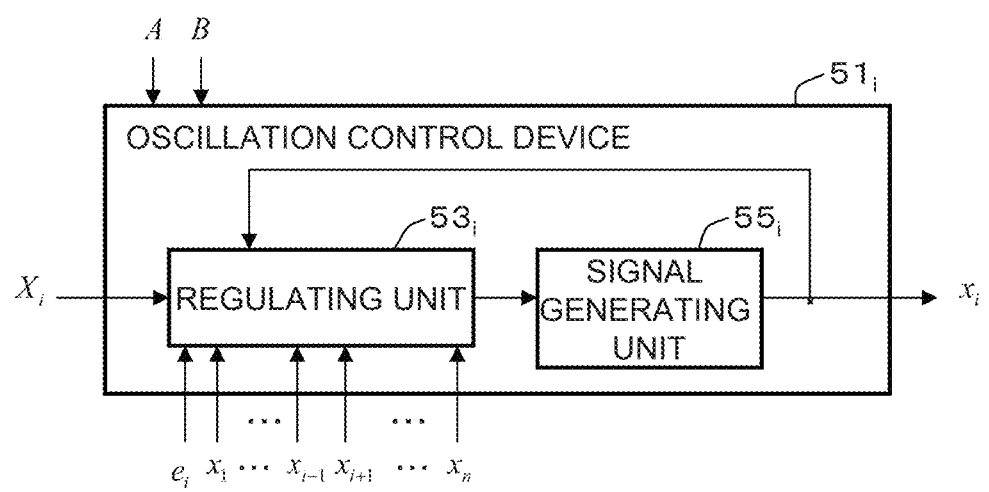
FIG. 13 shows a schematic block diagram illustrating an oscillation control device $51_i$ (i is a natural number equal to nor less) according to still another embodiment of the present invention.
Figure 14A:
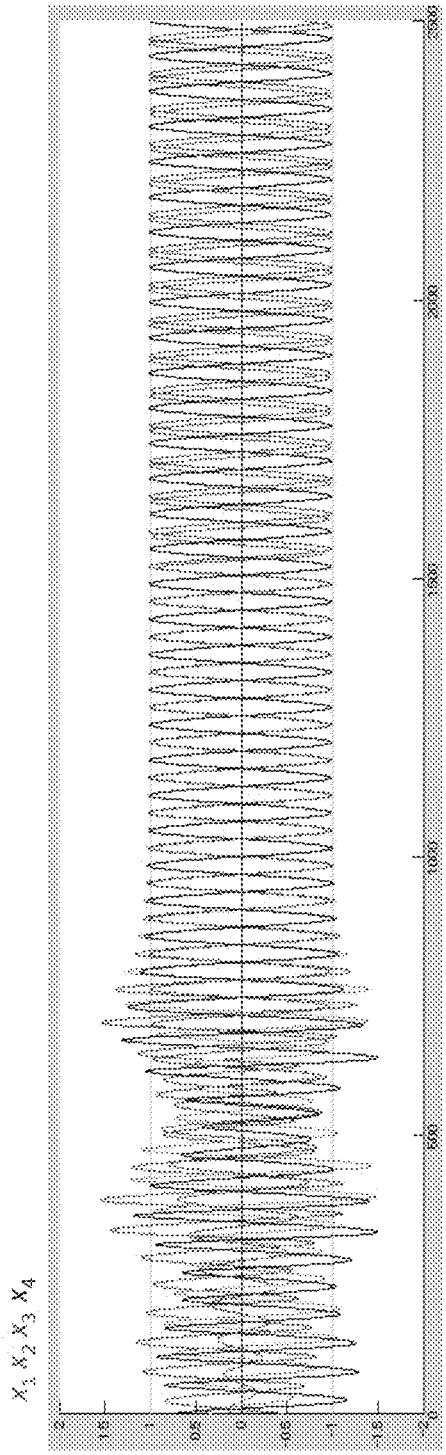
FIG. 14 shows the transition of (a) the output signal $x_i$ of each CPG and (b) $b_i$, when phase difference control is performed with an RG up to 1500 steps and performed with an external signal after 1500 steps.
Figure 14B:
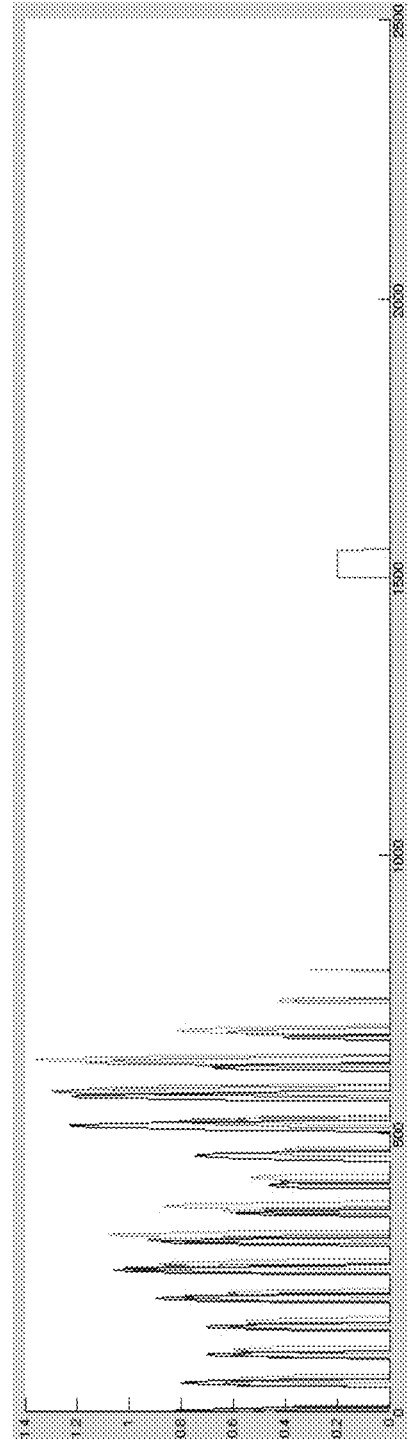
Figure 15A:
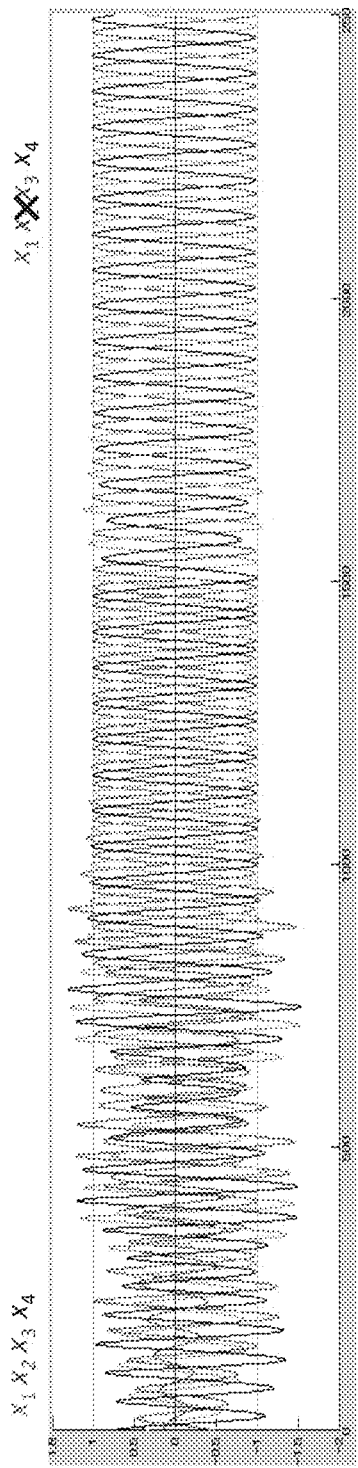
FIG. 15 shows the transition of (a) the output signal $x_i$ of each CPG and (b) $b_i$, when the $b_i$ is controlled so that the phase difference control is performed with the RG up to 1500 steps and that the sum of the control signal $x_i$ except the control signal $x_2$ becomes zero after 1500 steps.
Figure 15B:
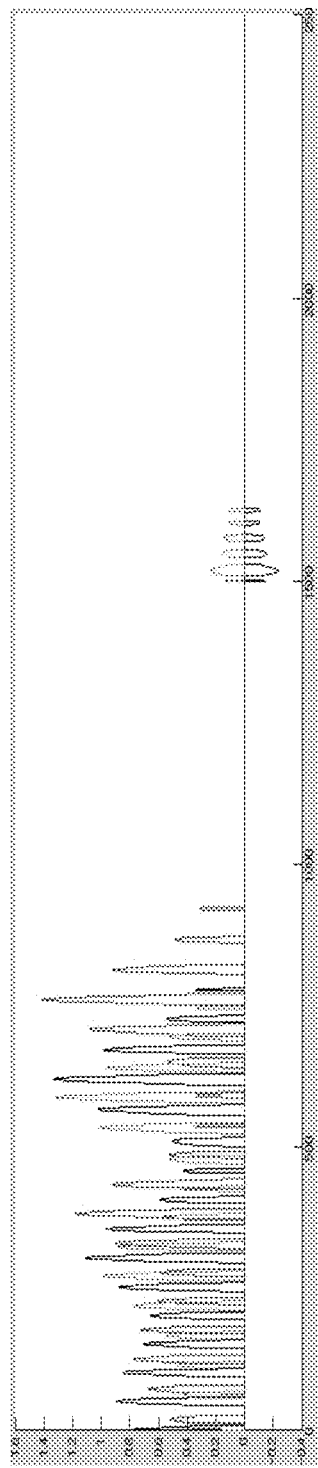

Referring to FIGS. 13, 14 and 15, a mechanism that generates various phase differences of another embodiment will be described below. As described later, the generation of such various phase differences enables to slightly adjust the phase difference between the basic signals generated by the rhythm generator RG and adapt to the change of the number of legs.

FIG. 13 shows a schematic block diagram illustrating an oscillation control device $51_i$ (i is a natural number equal to the number n of oscillation control devices or less in the system) according to still another embodiment of the present invention. Similarly to the oscillation control device $5_i$ of FIG. 1, the external rhythm generator inputs the target signal $X_i$ to the oscillation control device $51_i$. In FIG. 13, a signal (external signal) $e_i$ is externally inputted to a regulating unit $53_i$. Control signals $x_1, \ldots, x_{i-1}, x_{i+1}, \ldots, x_n$ are inputted to the regulating unit $53_i$ from other oscillation control devices.

First, the case where the regulating unit $53_i$ regulates the phase difference using the external signal $e_i$ will be described. In this embodiment, $B_i = B + b_i + e_i$ is used instead of equation (8). FIG. 14 shows the transition of (a) the output signal $x_i$ of each CPG and (b) $b_i$, when the phase difference control is operated with an RG up to 1500 steps and operated with the external signal after 1500 steps. The gait becomes the bound mode in the range of 800 to 1500 steps. The regulating unit $53_i$ regulates $B_i$ based on the external signal $e_i$ (the external signal $e_2 = 0.2$ in the range of 1500 to 1550 steps, and the external signal $e_i = 0$ in other ranges). As can be seen from FIG. 14, the phase difference is modified. Thus, as can be seen from FIG. 14, the waveform having the arbitrary phase difference can be generated by utilizing the external signal.

Then, the case where the regulating unit $53_i$ regulates the phase difference using the control signal of other oscillation control devices when, for example, the number of oscillation control devices is changed will be described. A relationship that the summation of $x_i$ is zero ($\Sigma x_i = 0$) always holds in a waveform having a deviation of (one period×1/n). Therefore, the waveform having the phase difference of the deviation of (one period×1/n) can be generated and controlled. FIG. 15 shows the transition of (a) the output signal $x_i$ of each CPG and (b) $b_i$, when $b_i$ is controlled so that the phase difference control is performed with the RG up to 1500 steps and that the sum of the control signal $x_i$ becomes zero after 1501 steps. The gait is the walk mode in the range of 1000 to 1500 steps, and the phase difference is set to $2\pi/4$. Now, it is assumed that the signal output unit for the right foreleg ($x_2$) is broken. In such cases, only the left foreleg ($x_1$), the left hind leg ($x_3$), and the right hind leg ($x_4$) can generate the control signals. Therefore, after 1500 steps, $x_2$ is set to zero without use of the RG, and $b_i$ is controlled so that the summation of $x_i$ becomes zero, which allows the phase difference to be set to $2\pi/3$. As can be seen from FIG. 15, the oscillation control device $51_i$ can adapt to the change of the number of legs.

Here, for example, Japanese Patent Publication Laid-Open No. 2006-289602 discloses a robot apparatus in which periodic motion of a moving unit is controlled with an oscillator having the feature of entrainment. Although the phase differences are aligned with each other, the robot apparatus differs from the present invention in that the robot apparatus does not have the independent controllability of the amplitude and period, that the entrainment of the oscillator is utilized (in the present invention, the period can be controlled directly), and that the Matsuoka model is used in the signal generating unit.

The VDP equation used in the CPG network of the embodiments is used only in the range where the VDP equation has the stable state. That is, the amplitude and amplitude of the sinusoidal oscillation that can be expressed by the proposed model are restricted. However, the moving range of each leg of the actual quadruped locomotion robot is mechanically determined, and it is not necessary to move the leg beyond the moving range. Therefore, the problem can be solved by considering the relationship between the output range of the output waveform that can be expressed by one VDP equation and the moving range of each leg.

In the quadruped locomotion animals, locomotion speed is increased as the gait makes the transition in the order of the walk, trot, bound, and gallop modes. In contrast, in the proposed technique, because the gait speed (period) is kept constant even after the gait is changed, it is necessary that the parameter B in the VDP equation is controlled in order to determine the gait speed when the gait transition is generated.

However, in the embodiments, the amplitude and the period can be substantially independently controlled, and the locomotion speed (period) can be controlled while the phase difference and the amplitude are fixed. Therefore, the embodiments can deal with the gait transitions.

Furthermore in the actual locomotion animal, when one leg stumbles over something, other legs are influenced by the stumbled leg to sophisticatedly change motion, and thereby the animal continues the stable gait. In the embodiments, although the CPGs do not have the mutual connection, sensor feedback, for example, can be effectively used. The CPG network can be more effective by feeding a signal of sensing the body balance back to each CPG, and by having the CPGs influence one another based on the body balance. For example, when the external device such as the sensor is added, the gait period can be regulated while the gait is kept constant (locomotion speed can be regulated). Besides, the designer can generate a preferred gait by, for example, changing the length of stride like extending it or by defining an arbitrary energy function. Further, the lengths of stride of only a part of legs can be changed, or the signal can be generated in order to generate the locomotion adapting to the change of the number of legs. These achievements have been hardly realized in the conventional CPG network.

The invention claimed is:

1. A control System comprising:
a plurality of oscillation control devices that generate control signals; and
a target signal generating device that generates a target signal for each of the oscillation control devices, the target signal entraining the oscillation control devices to synchronized movement, wherein
each of the oscillation control devices is an oscillating system which has a limit cycle and which operates independently of the other oscillation control devices, including:
a signal generating unit that generates a control signal based on a parameter concerning an amplitude and a parameter concerning a period of the control signal; and
a regulating unit that regulates the parameter concerning the amplitude and/or the parameter concerning the period based on the target signal and the control signal and thereby
an amplitude and a period of a control signal generated by the oscillation control device can be independently controlled,
assuming that $X_i$ is the target signal for the $i^{th}$ (i is a natural number equal to a number of the oscillation control devices or less) oscillation control device, the target signal generating device generates a signal $x_R$ obtained by a following equation:

$$\frac{d^2 x_R}{dt^2} - 2\varepsilon(A^2 - x_R^2)\frac{dx_R}{dt} + B^2 x_R = 0,$$

where A is a parameter concerning an amplitude of the target signal,
B is a parameter concerning a period of the target signal, and
$\varepsilon$ is a predetermined constant indicating a nonlinear ratio, and the target signal generating device generates the target signal $X_i$ for the $i^{th}$ oscillation control device based on the following equation:

$$X_i = c_{i1} x_R + c_{i2} \tau \frac{dx_R}{dt},$$

where $c_{i1}$ and $c_{i2}$ are constants indicating phase differences of the $i^{th}$ oscillation control device, and constant expressed by the following equation:

$$\tau = \frac{\max(x_R)}{\max\left(\frac{dx_R}{dt}\right)} = \frac{2A}{\max\left(\frac{dx_R}{dt}\right)},$$

and
constants $c_{i1}$ and $c_{i2}$ satisfy three conditions, that is
$\Sigma C_{i1} = \Sigma C_{i2}$ as a first condition,
$C_{i1} + C_{iZ} = 1$ or $-1$ as a second condition,
$C_{21} \neq C_{41}$ and $C_{11} \neq C_{31}$ as a third condition.

2. The control system according to claim 1, wherein the regulating unit of the $i^{th}$ oscillation control device sets the parameter $A_i$ concerning the amplitude to an externally provided parameter A,
the regulating unit includes a difference operation unit that calculates a difference between the control signal $x_i$ and the target signal $X_i$,
the regulating unit calculates a parameter $b_i$ by multiplying a coefficient k and a difference $x_i - X_i$ calculated by the difference operation unit, and the regulating unit calculates the parameter $B_i$ concerning the period by adding the externally provided parameter B and $b_i$.

3. The control system according to claim 1, wherein a number of a plurality of oscillation control devices is a number of plurality of legs of a robot,
the plurality of oscillation control devices correspond to the plurality of legs of the robot, respectively,
the control signal generated by each of the oscillation control devices is used to control motion of each leg of the robot to realize a gait, and
the regulating unit of each of the oscillation control devices performs regulating processing independently of a control signal generated by another oscillation control device.

4. A control signal generation method in a control system including a plurality of oscillation control devices that generate control signals, each of the oscillation control devices being an oscillating system which has a limit cycle and which operates independently of the other oscillation control devices, and a target signal generating device that generates a target signal for each of the plurality of the oscillation control devices,
the method comprising:
a step in which the target signal generating device generates a signal $x_R$ obtained by a following equation:

$$\frac{d^2 x_R}{dt^2} - 2\varepsilon(A^2 - x_R^2)\frac{dx_R}{dt} + B^2 x_R = 0,$$

where A: a parameter concerning an amplitude of the target signal,
B: a parameter concerning a period of the target signal, and ε: a predetermined constant indicating a nonlinear ratio,
in which the target signal generating device generates a target signal $X_i$ for the ith (i is a natural number equal to a number of the oscillation control devices or less) oscillation control device based on a following equation:

$$X_i = c_{i1} x_R + c_{i2} \tau \frac{dx_R}{dt},$$

where $c_{i1}$ and $C_{i2}$: constants indicating phase differences of the ith oscillation control device, and τ: a constant expressed by a following equation:

$$\tau = \frac{\max(x_R)}{\max\left(\frac{dx_R}{dt}\right)} = \frac{2A}{\max\left(\frac{dx_R}{dt}\right)},$$

and in which a signal generating unit of the ith oscillation control device generates a control signal $x_i$ based on a parameter concerning an amplitude and a parameter concerning a period of the control signal;

a regulating step in which a regulating unit of the ith oscillation generating device regulates the parameter concerning the amplitude and/or the parameter concerning the period based on the target signal $X_i$ and the control signal $x_i$; and a signal generating step in which the signal generating unit of the ith oscillation control device generates a new control signal $x_i$ based on the regulated parameter concerning the amplitude and the regulated parameter concerning the period, wherein an amplitude and a period of the control signal $x_i$ to be generated by the oscillation control device can independently be controlled.

* * * * *

UNITED STATES PATENT AND TRADEMARK OFFICE
CERTIFICATE OF CORRECTION

PATENT NO. : 8,417,389 B2
APPLICATION NO. : 12/920986
DATED : April 9, 2013
INVENTOR(S) : Takeshi Yamakawa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 154 days.

Signed and Sealed this
Eighteenth Day of June, 2013

Teresa Stanek Rea
*Acting Director of the United States Patent and Trademark Office*